M. J. MOSHER.
Cooking Stove.
No. 85,604. Patented Jan. 5, 1869.
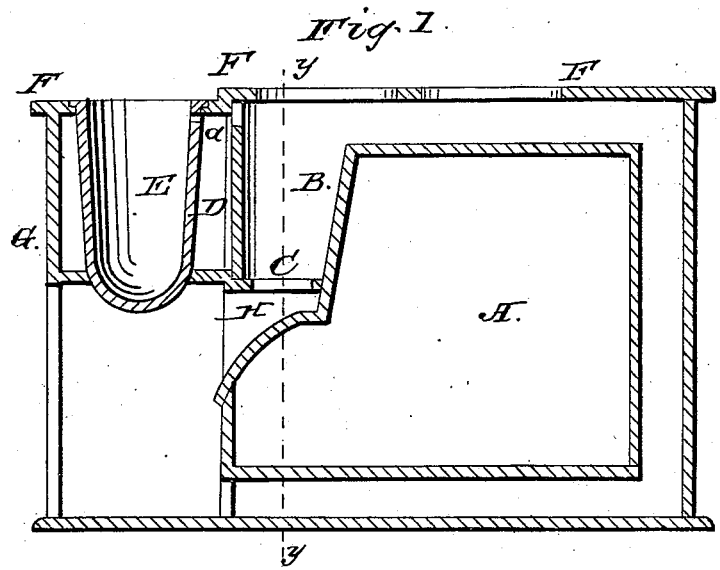
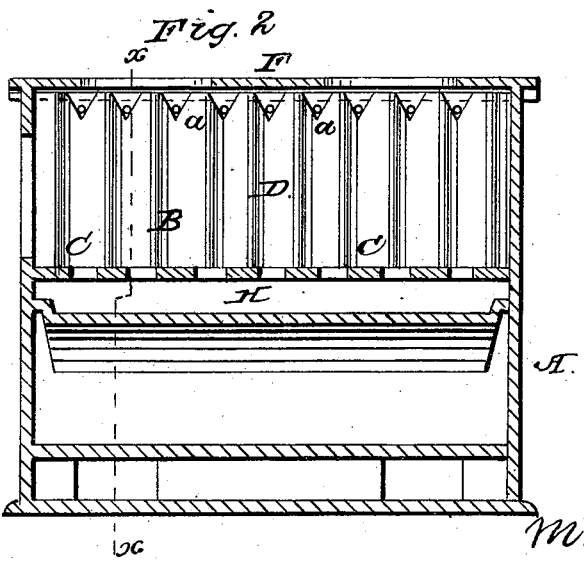

MARTIN J. MOSHER, OF TROY, NEW YORK.

Letters Patent No. 85,604, dated January 5, 1869.

RESERVOIR COOK-STOVE.

The Schedule referred to in these Letters Patent and making part of the same.

*To all whom it may concern:*

Be it known that I, MARTIN J. MOSHER, of the city of Troy, county of Rensselaer, and State of New York, have invented new and useful Improvements in "Cooking-Stoves" and Ranges; and I do hereby declare that the following is a full, clear, and exact description of my said invention, reference being had to the accompanying drawings, in which—

Figure 1 is a vertical longitudinal section of my improved stove, taken on the line $x$ $x$, fig. 2.

Figure 2 is a vertical cross-section of the same, taken on the line $y$–$y$, fig. 1.

Like letters represent and refer to like or corresponding parts.

My invention relates to a hot-water reservoir, placed in front of the stove or range, and heated by radiation from the fire-box and other parts of the stove; and consists in the employment of a casing surrounding said reservoir in the front, rear, and on each side, and forming a hot-air chamber, as hereinafter more fully described and set forth.

To enable others skilled in the art to which my invention relates, to make and use the same, I will here proceed to describe the construction and operation thereof, which is as follows, to wit:

A represents a cooking-stove or range, of ordinary construction;

B is the fire-box;

c, the grate in the same; and

D is the front plate in the fire-box.

E represents the hot-water reservoir, which is suspended from the top of the casing, and is set through the aperture F F in said top. Said reservoir E is constructed with a rim around the top thereof, which rests upon a flange running around the inside of said aperture, as shown in fig. 1, so that the reservoir may be lifted out and removed when desirable.

The reservoir is of the usual construction, and may be made of sheet-metal or other suitable material.

G represents the front plate of a casing which surrounds the reservoir in front and on the sides and bottom, and which, with the front of the fire-box D, forms a hot-air chamber. By this device, the reservoir is quickly heated, without exposing it to the full action of the fire, and, by removing the said reservoir, the said hot-air chamber may be used for baking and other culinary purposes. Of course the door to the fire-box must be at the side of the stove, as shown at fig. 2. The bottom of the casing need not extend entirely under the reservoir, but may have an aperture or opening, into which the bottom of the reservoir sets, as shown at fig. 1.

Having thus described the nature of my said invention and improvements,

What I claim as my invention, and desire to secure by Letters Patent of the United States, is—

The outer casing G, enclosing the reservoir E, and forming a hot-air chamber around the same, when combined with such a reservoir placed in front of the fire-box B of a stove or range, substantially as fully hereinbefore described and set forth.

MARTIN J. MOSHER.

Witnesses:
ALEX. F. ROBERTS,
J. M. COVINGTON.